United States Patent
Lin et al.

(10) Patent No.: US 12,405,910 B2
(45) Date of Patent: Sep. 2, 2025

(54) COMPUTER PERIPHERAL DEVICE

(71) Applicant: ASUSTEK COMPUTER INC., Taipei (TW)

(72) Inventors: Kuo-En Lin, Taipei (TW); Shau-Yang Hsieh, Taipei (TW); Ping-Chi Huang, Taipei (TW); Chih-Yuan Lin, Taipei (TW); Shih-Hung Chou, Taipei (TW); Xin-Han Cai, Taipei (TW); Jian-Hong Zeng, Taipei (TW); Yi-Kuang Chen, Taipei (TW); I-Ting Hsieh, Taipei (TW); Jun-Wei Su, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 41 days.

(21) Appl. No.: 18/482,585

(22) Filed: Oct. 6, 2023

(65) Prior Publication Data
US 2025/0013592 A1 Jan. 9, 2025

(30) Foreign Application Priority Data
Jul. 4, 2023 (TW) .................. 112124835

(51) Int. Cl.
*G06F 13/38* (2006.01)
(52) U.S. Cl.
CPC .... *G06F 13/385* (2013.01); *G06F 2213/0042* (2013.01)
(58) Field of Classification Search
CPC ................. G06F 13/385; G06F 2213/0042
See application file for complete search history.

(56) References Cited

U.S. PATENT DOCUMENTS

| | | | |
|---|---|---|---|
| 12,117,950 B2 * | 10/2024 | Busono | G06F 13/4295 |
| 2006/0064521 A1 | 3/2006 | Lin | |
| 2007/0300006 A1 * | 12/2007 | Lin | G06F 13/385 |
| | | | 710/315 |

(Continued)

FOREIGN PATENT DOCUMENTS

| | | |
|---|---|---|
| CN | 1748222 A | 3/2006 |
| CN | 1955890 A | 5/2007 |

(Continued)

*Primary Examiner* — Henry Tsai
*Assistant Examiner* — Aurangzeb Hassan
(74) *Attorney, Agent, or Firm* — MUNCY, GEISSLER, OLDS & LOWE, P.C.

(57) ABSTRACT

A computer peripheral device is provided. The computer peripheral device is adapted to be installed in an electronic device supporting signal transmission of a first signal frequency. The computer peripheral device includes a human interface device (HID) and a bridging device. The HID includes a control unit to support signal transmission of a second signal frequency. The bridging device includes a first universal serial bus (USB) interface unit and a second USB interface unit. The first USB interface unit is adapted to be electrically connected to the electronic device, and supports signal transmission of the first signal frequency. The second USB interface unit is adapted to be electrically connected to the HID. The second USB interface unit regards the HID as a communication device class (CDC) device, instructs the control unit to generate an input signal at a timing corresponding to the first signal frequency, and transmits the input signal to the electronic device.

9 Claims, 1 Drawing Sheet

(56) References Cited

U.S. PATENT DOCUMENTS

| | | | |
|---|---|---|---|
| 2012/0117276 A1* | 5/2012 | Salamon | H04L 12/2832 |
| | | | 710/16 |
| 2013/0013823 A1* | 1/2013 | Altmayer | G06F 13/385 |
| | | | 710/33 |
| 2022/0164009 A1* | 5/2022 | Sagotsky | G11B 33/122 |
| 2022/0391335 A1* | 12/2022 | Radfar | G06F 13/1673 |
| 2023/0241987 A1* | 8/2023 | Liu | H02J 50/12 |
| | | | 320/109 |
| 2024/0184729 A1* | 6/2024 | Jaramillo | G06F 13/385 |

FOREIGN PATENT DOCUMENTS

| | | |
|---|---|---|
| CN | 101788972 B | 7/2012 |
| CN | 104077252 A | 10/2014 |
| CN | 111090608 A | 5/2020 |
| TW | 200611131 | 4/2006 |

* cited by examiner

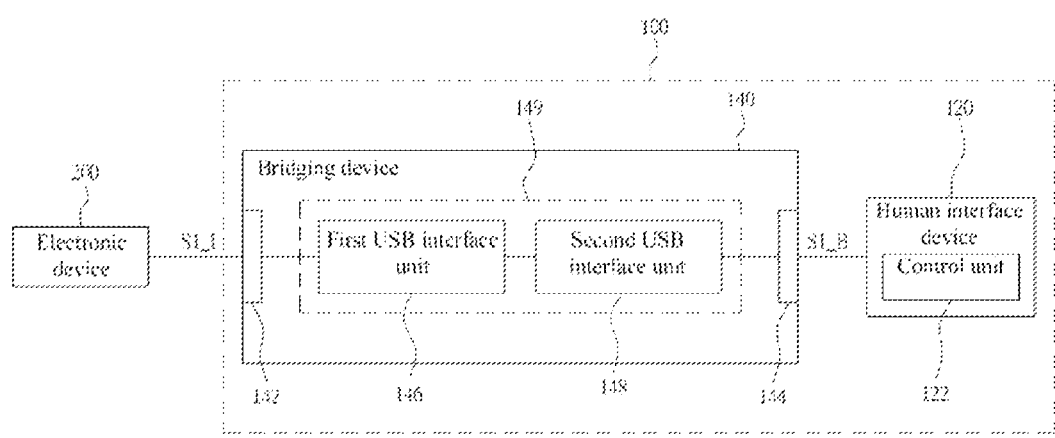

COMPUTER PERIPHERAL DEVICE

CROSS-REFERENCE TO RELATED APPLICATION

This application claims the priority benefit of Taiwan application serial No. 112124835, filed on Jul. 4, 2023. The entirety of the above-mentioned patent application is hereby incorporated by reference herein and made a part of the specification.

BACKGROUND OF THE INVENTION

Field of the Invention

The disclosure relates to a computer peripheral device, and in particular, to a computer peripheral device applicable to a universal serial bus (USB) protocol.

Description of the Related Art

A conventional USB human interface device, such as a keyboard or a mouse, is usually matched with a microcontroller unit supporting low speed signal transmission to reduce costs.

In this case, even if a USB interface on a computer host supports high speed signal transmission, the USB interface is limited by the HID and only performs signal transmission at a low speed, failing to effectively take advantage of the high speed signal transmission.

BRIEF SUMMARY OF THE INVENTION

The disclosure provides a computer peripheral device, adapted to be installed in an electronic device. The electronic device supports signal transmission of a first signal frequency according to a USB protocol. The computer peripheral device includes an HID and a bridging device. The HID includes a control unit, and the control unit supports signal transmission of a second signal frequency according to the USB protocol.

The bridging device includes a first USB interface unit and a second USB interface unit. The first USB interface unit is adapted to be electrically connected to the electronic device. The first USB interface unit supports signal transmission of the first signal frequency according to the USB protocol. The second USB interface unit is adapted to be electrically connected to the HID. The second USB interface unit regards the HID as a communication device class (CDC) device, instructs the control unit to generate an input signal at a timing corresponding to the first signal frequency, and transmits the received input signal to the electronic device through the first USB interface unit.

The computer peripheral device provided in the disclosure includes the bridging device as the bridge between the HID and the electronic device. The bridging device regards the HID in the disclosure as a CDC device defined by the USB protocol, rather than an HID class device. In this way, the HID generates the input signal at the timing corresponding to the first signal frequency.

Because both the bridging device and the electronic device support the higher first signal frequency, the input signal is smoothly transmitted to the electronic device through the first USB interface unit. In this way, the HID communicates with the electronic device at the higher first signal frequency without being limited by the fact that the HID only supports the lower second signal frequency.

BRIEF DESCRIPTION OF THE DRAWINGS

The sole FIGURE is a schematic block diagram of a computer peripheral device according to an embodiment of the disclosure.

DETAILED DESCRIPTION OF THE EMBODIMENTS

The following describes specific implementations of the disclosure in more detail with reference to the drawings. According to the following description and scope of patent application, advantages and characteristics of the disclosure are clearer. It is to be noted that, the drawings adopt a very simplified form and use a non-precise proportion, and are only used for conveniently and clearly illustrating the embodiments of the disclosure.

The sole FIGURE is a schematic block diagram of a computer peripheral device 100 according to an embodiment of the disclosure. The computer peripheral device 100 is adapted to be installed in an electronic device 200, such as a computer host, a notebook computer, or other electronic devices that support a USB protocol and is used as a host under the USB protocol. According to the definition of the USB protocol, the electronic device 200 supports signal transmission of a first signal frequency at most. In an embodiment, the first signal frequency corresponds to USB high speed signal transmission.

As shown in the FIGURE, the computer peripheral device 100 includes an HID 120 and a bridging device 140.

The HID 120 includes a control unit 122. According to the definition of the USB protocol, the control unit 122 supports signal transmission of a second signal frequency at most for HID class devices. In an embodiment, the HID 120 is a mouse. In an embodiment, the second signal frequency corresponds to USB full speed (FS) mode signal transmission with the upper limit of 1 kHz. The first signal frequency is higher than the second signal frequency. For the definition of the USB high speed (HS) mode signal transmission, the frequency reaches 8 KHz.

The bridging device 140 includes a first port 142, a second port 144, a first USB interface unit 146, and a second USB interface unit 148. The first port 142 is adapted to be connected to the electronic device 200, and the second port 144 is adapted to be connected to the HID 120. The first USB interface unit 146 is electrically connected to the electronic device 200 through the first port 142. The second USB interface unit 148 is electrically connected to the HID 120 through the second port 144.

In an embodiment, as shown in the FIGURE, the first USB interface unit 146 and the second USB interface unit 148 are integrated in an MCU 149 to reduce the manufacturing cost and reduce the size of the bridging device 140. In another embodiment, the bridging device 140 is a wireless dongle.

The first USB interface unit 146 is a device interface unit adapted to be electrically connected to the electronic device 200. According to the definition of the USB protocol, the first USB interface unit 146 supports signal transmission of the first signal frequency at most.

The second USB interface unit 148 is a host interface unit adapted to be electrically connected to the HID 120. According to the definition of the USB protocol, the second USB interface unit 148 supports the signal transmission of the second signal frequency at most for HID class devices.

When the first port 142 is plugged into the electronic device 200 and the HID 120 is plugged into the second port 144, the second USB interface unit 148 regards the HID 120 as a communication device class (CDC) device defined by the USB protocol, and instructs the control unit 122 to transmit an input signal S1_B at the first signal frequency in a bulk transfer manner.

Specifically, the control unit 122 controls a transmission timing in bulk transfer to simulate the input signal S1_B of the first signal frequency, that is, generates the input signal S1_B at a timing corresponding to the first signal frequency. For example, when the first signal frequency is 8 kHz, the control unit 122 controls the transmission timing in bulk transfer to 125 microseconds to simulate the input signal S1_B of 8 kHz.

After receiving the input signal S1_B, the second USB interface unit 148 transmits an input signal S1_I to the electronic device 200 through the first USB interface unit 146 at a transmission speed of the first signal frequency.

It is worth noting that in this architecture, a transmission interface between the second USB interface unit 148 and the control unit 122 is based on a transmission manner corresponding to the CDC device defined by the USB protocol, that is, a bulk transfer manner, for data transmission. This transmission manner supports high signal frequencies. A transmission interface between the first USB interface unit 146 and the electronic device 200 is based on a transmission manner corresponding to the HID 120 defined by the USB protocol, that is, an interrupt transfer manner, for data transmission.

In this specification, the input signal S1_B transmitted from the control unit 122 to the second USB interface unit 148 and the input signal S1_I transmitted from the first USB interface unit 146 to the electronic device 200 are represented with different symbols to illustrate that although the two input signals S1_B and S1_I have the same signal frequency for data transmission, they are generated in different signal transmission manners.

In an embodiment, the control unit 122 is preset to perform signal transmission at the second signal frequency in an interrupt transfer manner. In this way, when the HID 120 is directly plugged into the electronic device 200, a USB control chip (not shown in the drawing) in the electronic device 200 communicates with the HID 120 in the interrupt transfer manner based on the second signal frequency supported by the control unit 122 in the HID 120.

On the contrary, when the HID 120 is connected to the electronic device 200 through the bridging device 140, and the interface transmission signal frequency supported by the electronic device 200 is higher than the second signal frequency, such as supporting the first signal frequency, the second USB interface unit 148 regards the HID 120 as a CDC device, so that it transmits the input signal S1_B at the first signal frequency in the bulk transfer manner.

In this way, data transmission is performed between the HID 120 and the electronic device 200 at the transmission speed of the first signal frequency, instead of being limited to the HID 120, to perform the signal transmission only at the second signal frequency.

The computer peripheral device 100 provided in the disclosure includes the bridging device 140 as the bridge between the HID 120 and the electronic device 200. The bridging device 140 regards the HID 120 in the disclosure as a CDC device defined by the USB protocol rather than an HID class device. In this way, the HID 120 generates the input signal S1_B at the timing corresponding to the first signal frequency.

Because both the bridging device 140 and the electronic device 200 support the first signal frequency, the input signals S1_B and S1_I are smoothly transmitted to the electronic device 200 through the first USB interface unit 146. In this way, the HID 120 communicates with the electronic device 200 at the higher first signal frequency without being limited by the fact that the HID 120 only supports the lower second signal frequency.

The above is only an exemplary embodiment of the disclosure, and does not limit the disclosure. Variations such as equivalent replacements or modifications in any form made by any person skilled in the art to the technical means and technical contents disclosed in the disclosure without departing from the technical means of the disclosure are contents not departing from the technical means of the disclosure and still fall within the protection scope of the disclosure.

What is claimed is:

1. A computer peripheral device, adapted to be installed in an electronic device, wherein the electronic device supports signal transmission of a first signal frequency according to a universal serial bus (USB) protocol, and the computer peripheral device comprises:
    a human interface device (HID) class device, comprising a control unit, wherein the control unit supports signal transmission of a second signal frequency according to the USB protocol; and
    a bridging device, comprising:
        a first USB interface unit, adapted to be electrically connected to the electronic device, wherein the first USB interface unit supports signal transmission of the first signal frequency according to the USB protocol; and
        a second USB interface unit, adapted to be electrically connected to the HID class device, wherein when the HID class device is electrically connected to the bridge device, the second USB interface unit regards the HID class device as a communication device class (CDC) device, instructs the control unit to generate an input signal at a timing corresponding to the first signal frequency, and transmits the received input signal to the electronic device through the first USB interface unit.

2. The computer peripheral device according to claim 1, wherein the second signal frequency corresponds to USB full speed mode signal transmission, and the first signal frequency corresponds to USB high speed mode signal transmission.

3. The computer peripheral device according to claim 1, wherein the first signal frequency is higher than the second signal frequency.

4. The computer peripheral device according to claim 1, wherein the control unit transmits the input signal at the first signal frequency in a bulk transfer manner.

5. The computer peripheral device according to claim 1, wherein the HID class device is a mouse.

6. The computer peripheral device according to claim 1, wherein the control unit is preset to perform signal transmission at the second signal frequency in an interrupt transfer manner.

7. The computer peripheral device according to claim 1, wherein the first USB interface unit is a device interface unit, and the second USB interface unit is a host interface unit.

8. The computer peripheral device according to claim 1, wherein the bridging device comprises a first port and a second port, the first USB interface unit is electrically connected to the electronic device through the first port, and the second USB interface unit is electrically connected to the HID class device through the second port.

9. The computer peripheral device according to claim 1, wherein the first USB interface unit and the second USB interface unit are integrated in a microcontroller unit (MCU).

\* \* \* \* \*